United States Patent Office 3,531,542
Patented Sept. 29, 1970

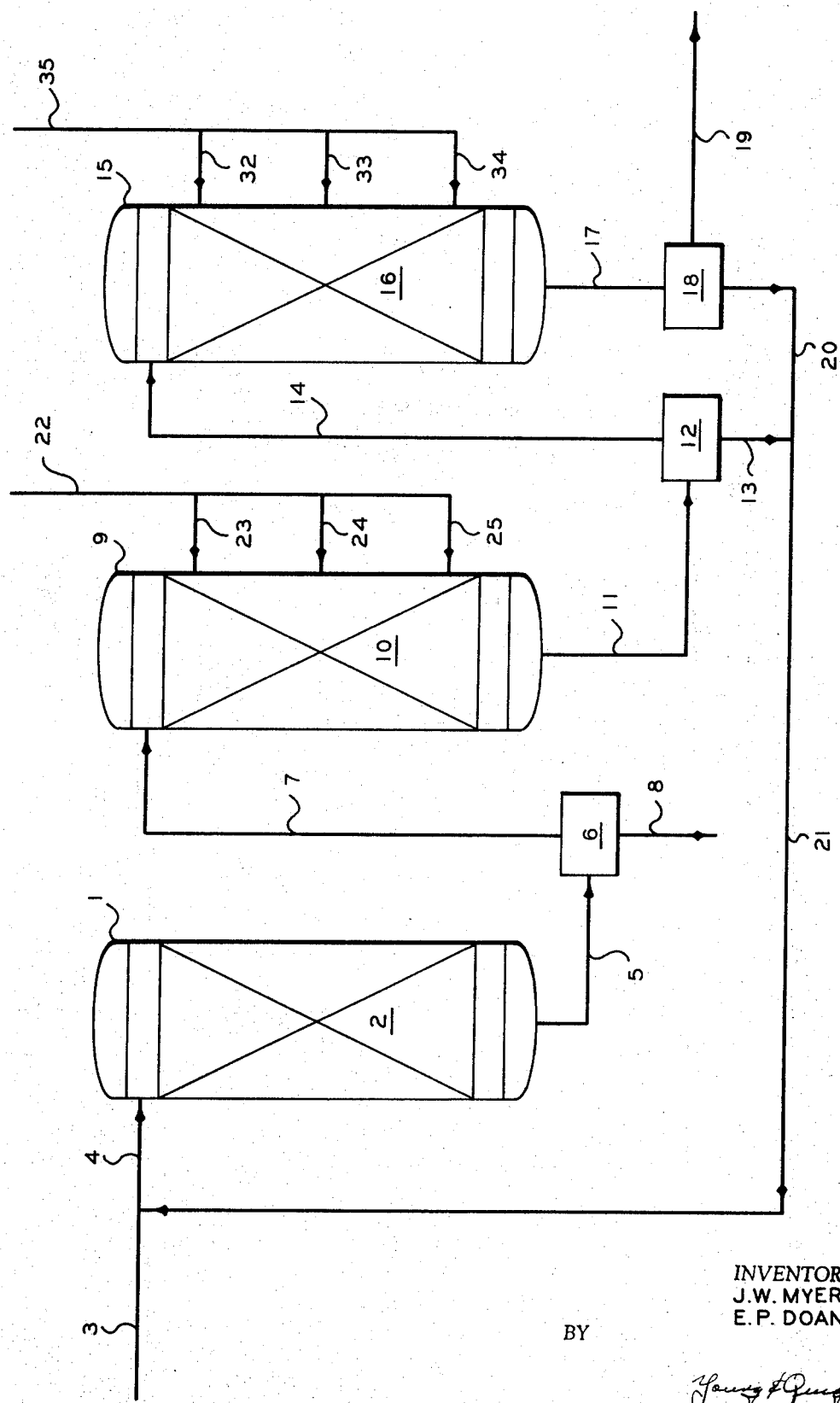

3,531,542
OLEFIN ISOMERIZATION PROCESS
John W. Myers and Elliott P. Doane, Bartlesville, Okla., assignors to Phillips Petroleum Company, a corporation of Delaware
Filed Sept. 4, 1968, Ser. No. 757,246
Int. Cl. C07c 5/22
U.S. Cl. 260—683.2                                              5 Claims

ABSTRACT OF THE DISCLOSURE

An olefin isomerization process in which skeletal isomerization is first promoted to produce the desired isomer in a reaction product mixture, with controlled double bond isomerization being conducted thereafter to facilitate the separation of the desired product.

---

This invention relates to olefin isomerization.

In one of its more specific aspects, this invention relates to selective isomerization.

Isomerization processes can be directed towards either skeletal isomerization or double bond isomerization. Skeletal isomerization is concerned with reorientation of the molecular structure in respect to the formation or elimination of side chains. Double bond isomerization is concerned with relocation of the double bond between carbon atoms. Most isomerization processes give rise to reactions of both types.

There has now been developed an improved isomerization process, the principal purpose of which is skeletal isomerization. However, the process employs double bond isomerization to facilitate separation of the desired product. This process comprises a multiplicity of isomerization steps and accompanying separation steps, each of the isomerization steps being conducted under such conditions and with such catalysts as to maximize the desired type of isomerization and optimize separation of the desired product in a substantially pure form.

More specifically, this invention contemplates a multistage isomerization process in which the desired product is produced in the first stage, the subsequent isomerization steps being directed to isomerize hydrocarbons having boiling points proximate those of the desired product, to produce hydrocarbons having boiling points more removed from those of the desired product, hence facilitating the separation of the desired product from the reaction product mixture.

In one specific embodiment of this invention, a n-butene fraction is isomerized to produce isobutene in a mixture of butene-1 and butene-2. Separation of the isobutene by fractionation at this point is difficult inasmuch as isobutene has a boiling point of about 19.6° C., butene-1 has a boiling point of about 20.7° C., and the butene-2 isomers have boiling points of about 33.6° C. and 38.7° C. Hence, the initial isomerization step is followed by sequential isomerization steps in which butene-1 is isomerized to butene-2 and by accompanying fractionation steps in which the more easily separable butene-2 is separated from a fraction containing isobutene and butene-1.

In other words, the butene-1 may be considered as having a boiling point inseparably similar to that of the isobutene in that its boiling point is so similar, or close, to that of isobutene as to make a mixture of the two compounds inseparable by practical, conventional methods.

Conversely, the butene-2 may be considered as having a boiling point separably dissimilar from that of the isobutene in that its boiling point is so dissimilar, or remote, from that of isobutene as to permit the two compounds to be separated from each other by practical conventional methods.

However, inasmuch as methods other than those employing differences in boiling points can be used to separate the isomers, as used herein, the terms "separably dissimilar" and "inseparably similar" will relate to any such property on which separations of any nature are based.

Accordingly, it is an object of this invention to provide an improved isomerization process.

It is another object of this invention to provide an improved process for producing isobutene.

This invention contemplates skeletal isomerization over catalysts which include the activated aluminas, of which eta-alumina is preferred, halogen-treated alumina, boria alumina, certain of the silica-alumina complexes, and the like, at temperatures from about 600° F. to about 1200° F., at pressures of about atmospheric to about 250 p.s.i.g., at space velocities from about 0.1 to about 20 liquid volumes of olefin per volume of catalyst per hour, and—optionally—up to 20 mols per mol of olefin of a diluent such as hydrogen, nitrogen, carbon dioxide, the $C_1$–$C_4$ paraffins, and the like.

This invention contemplates double bond isomerization over palladium on alumina catalyst, particularly, and over noble metal catalysts of high isomerization activity as generally employed. Such catalysts are generally selective at the moderate conditions employable in the double bond isomerization steps of this process, that is, at temperatures from about 120° F. to about 450° F., at pressures of about atmospheric to about 250 p.s.i.g., at space velocities from about 0.4 to about 40 liquid volumes of olefin per volume of catalyst per hour, and in the presence of 0.001 to 0.5 mol of hydrogen per mol of olefin feed.

This invention contemplates a product separation stage after each catalytic isomerization step, in which stage the composition of the fraction charged to the subsequent isomerization step is adjusted favorably in respect to the equilibrium conditions to be encountered within that step.

The process of this invention will be more easily understood when explained in reference to the attached drawing in which one specific embodiment of the process is schematically represented.

A mixture of normal butenes is charged to catalyst vessel 1, which contains catalyst bed 2, through conduit 3.

Catalyst bed 2 consists of eta-alumina catalyst and is operated with sufficient catalyst to provide a liquid hourly space velocity from about 3.5 to about 4.5 volumes of olefin per volume of catalyst at a pressure of about 1 atmosphere and at a temperature from about 850° F. to about 950° F.

Catalyst bed construction and reactant introduction thereinto is made in the conventional manner.

The product stream from catalyst vessel 1 leaves through conduit 5 and enters separation zone 6.

Separation zone 6 can employ any method of separating some small percentage of by-products formed in this reaction. These by-products are disposed of through conduit 8 with the butene compounds being charged through conduit 7 to catalyst vessel 9.

Catalyst vessel 9 contains catalyst bed 10 which consists of a conventional palladium-alumina catalyst in sufficient quantity to provide a liquid hourly space velocity of about 3.5 to about 4.5 for that material charged thereto through conduit 7. Catalyst bed 10 is operated at a temperature of about 175° to about 225° F. and a pressure of about 8 to about 10 atmospheres. Hydrogen is supplied to catalyst bed 10, preferentially by multiple-point injection through conduits 22, 23, 24, and 25, at a total rate of about 0.002 mol of hydrogen per total mol of hydrocarbon charged to the catalyst bed.

The effluent from catalyst bed 10 passes through conduit 11 into separation zone 12 in which essentially complete separation is made between isobutene and the butene-2. The butene-2 leaves separation zone 12 through conduit 13, and is recycled through conduits 21 and 4 back to catalyst vessel 1.

The isobutene fraction, with some residual portion of n-butenes, passes from separation zone 12 through conduit 14 into catalyst vessel 15.

of about 25 parts per million of chlorine to the butene feed.

Typical composition and yield data for the process of this invention are tabulated below, based upon a run in which 100 pounds are charged to the process, 36.5 pounds being fresh n-butene and 63.5 pounds being recycle of the composition indicated in the column headed "Recycle to Catalyst Vessel 1."

| Component, Wt. Percent | To Separation Zone 6 | To Catalyst Vessel 10 | To Separation Zone 12 | To Catalyst Vessel 16 | To Separation Zone 18 | Product Thru Conduit 19 | Recycle To Catalyst Vessel 1 |
|---|---|---|---|---|---|---|---|
| Isobutene | 30 | 30 | 30 | 29 | 29 | 29 | 1 |
| Butene-1 | 18 | 18 | 6 | 5 | 1 | 0.5 | 1.5 |
| Butene-2 | 45 | 45 | 57 | 3 | 7 | 0 | 61 |
| By-Product | 7 | 0 | 0 | 0 | 0 | 0 | 0 |

Catalyst vessel 15 contains catalyst bed 16 which consists of a conventional palladium-alumina catalyst operated under substantially the same conditions as is that catalyst of vessel 9, hydrogen being introduced thereinto through conduit 35 in multiple point injection through conduits 32, 33 and 34.

The product stream from catalyst vessel 15 passes through conduit 17 to separation zone 18 in which the isobutene product is taken overhead through conduit 19 and from which residual butenes are recirculated through conduits 20, 21 and 4 into catalyst vessel 1.

Typical composition and yield data for the process of this invention are tabulated below, based upon a run in which 100 pounds are charged to the process, 23.5 pounds being fresh n-butene and 76.5 pounds being recycle of the composition indicated in the column headed "Recycle to Catalyst Vessel 1."

These data indicate the isomerization of butenes-1 and -2 to form isobutene when employing a halogen activated alumina.

While the invention has been discussed in terms of the butenes, it will be evident that it is equally adaptable to other hydrocarbons, such as the pentenes, hexenes, octenes, dodecenes, and the like. Similarly, while discussed in terms of separation by fractionation, the invention is equally applicable to other methods of separation, such as solvent extraction, extraction distillation, azeotropic distillation, and the like. Similarly, more than the number of steps described can be sequentially involved.

What is claimed is:

1. A process for isomerizing n-butene to produce isobutene which comprises contacting n-butene with an isomerization catalyst selected from the group consisting of eta alumina, halogen treated alumina, boria alumina and silica alumina complexes to produce a mixture com-

| Component, Wt. Percent | To Separation Zone 6 | To Catalyst Vessel 10 | To Separation Zone 12 | To Catalyst Vessel 16 | To Separation Zone 18 | Product Thru Conduit 19 | Recycle To Catalyst Vessel 1 |
|---|---|---|---|---|---|---|---|
| Isobutene | 20 | 20 | 20 | 19 | 19 | 18.0 | 2 |
| Butene-1 | 21 | 21 | 7 | 6.5 | 1 | 0.5 | 1 |
| Butene-2 | 54 | 54 | 68 | 3.5 | 9 | 0 | 73.5 |
| By-Product | 5 | 0 | 0 | 0 | 0 | 0 | 0 |

These data indicate the isomerization of butenes-1 and -2 to form isobutene at a yield of approximately 18 weight percent per-pass. These data further indicate that by the simple expedient of double bond isomerization following skeletal isomerization, the separation of the products formed in the skeletal isomerization step is facilitated and product contamination minimized.

A second run is made employing the method of this invention in which catalyst bed 2 consists of alumina promoted with 1 percent HCl. The bed is operated with sufficient catalyst to provide a liquid hourly space velocity of about 6.0 at a pressure of one atmosphere and at a temperature of about 900° F. Sufficient 2-chloro-2-methylpropane is added with the feed to supply the equivalent prising isobutene, butene-1 and butene-2, contacting said mixture with a noble metal catalyst to convert said butene-1 and butene-2, and recovering said isobutene.

2. In the process of claim 1 the noble metal catalyst is palladium on alumina.

3. In the process of claim 1 the halogen-treated alumina catalyst is alumina promoted with hydrogen chloride.

4. In the process of claim 3 in which the n-butene feed contains 2-chloro-2-methyl propane.

5. The process as defined in claim 1 in which the isomerization steps are conducted at temperatures from about 120° F. to about 1200° F., at pressures of about atmospheric to about 250 p.s.i.g. and at space velocities of about 0.1 to about 40 volumes of olefin per volume of catalyst.

References Cited

UNITED STATES PATENTS

| 2,388,510 | 11/1945 | Voge | 260—683.2 |
| 3,352,939 | 11/1967 | Breckoff | 260—683.2 |
| 3,381,052 | 4/1968 | McGrath | 260—683.2 |
| 2,960,550 | 11/1960 | Feller | 260—683.2 |
| 3,345,428 | 10/1967 | McGrath | 260—683.2 |
| 2,395,274 | 2/1946 | Hillyer et al. | 260—683.2 |

DELBERT E. GANTZ, Primary Examiner

V. O'KEEFE, Assistant Examiner

UNITED STATES PATENT OFFICE

CERTIFICATE OF CORRECTION

Patent No. 3,531,542     John W. Myers et al     Dated: September 29, 1970

It is certified that error appears in the above-identified patent and that said Letters Patent are hereby corrected as shown below:

Column 4, line 51, "and" first occurrence should read --- to ---.

SIGNED AND SEALED
DEC 15 1970

(SEAL)
Attest:

Edward M. Fletcher, Jr.
Attesting Officer

WILLIAM E. SCHUYLER, JR.
Commissioner of Patents